(12) United States Patent
Bohnen et al.

(10) Patent No.: US 6,500,908 B1
(45) Date of Patent: Dec. 31, 2002

(54) CATALYST SYSTEM

(75) Inventors: Hans Bohnen, Moers (DE); Cornelia Fritze, Frankfurt (DE)

(73) Assignee: Basell Polyolefine GmbH, Ludwigshafen (DE)

( * ) Notice: Subject to any disclaimer, the term of this patent is extended or adjusted under 35 U.S.C. 154(b) by 0 days.

(21) Appl. No.: 09/509,787

(22) PCT Filed: Sep. 3, 1998

(86) PCT No.: PCT/EP98/05589

§ 371 (c)(1),
(2), (4) Date: Jun. 9, 2000

(87) PCT Pub. No.: WO99/18135

PCT Pub. Date: Apr. 15, 1999

(30) Foreign Application Priority Data

Oct. 6, 1997 (DE) .......................................... 197 44 102

(51) Int. Cl.$^7$ .................................................. C08F 4/52
(52) U.S. Cl. ........................ 526/160; 526/170; 526/129; 526/159
(58) Field of Search ................................. 526/170, 129, 526/159, 160, 943

(56) References Cited

U.S. PATENT DOCUMENTS

| | | | |
|---|---|---|---|
| 5,348,299 A | | 9/1994 | Clapper |
| 5,449,650 A | * | 9/1995 | Sugano et al. ............... 502/117 |
| 5,473,028 A | * | 12/1995 | Nowlin et al. ............... 526/114 |

FOREIGN PATENT DOCUMENTS

| | | |
|---|---|---|
| EP | 426 637 | 5/1991 |
| EP | 427 697 | 5/1991 |
| EP | 520 732 | 12/1992 |
| EP | 558 158 | 9/1993 |
| EP | 601 830 | 6/1994 |
| WO | 92/01005 | 1/1992 |

OTHER PUBLICATIONS

Angew.Chem.1995, 107, 1255–1283, Brintzinger et al.
J.Am.Chem.Soc.1991, 113,3623–3625, Yang et al.

* cited by examiner

*Primary Examiner*—David W. Wu
*Assistant Examiner*—William K. Cheung
(74) *Attorney, Agent, or Firm*—Keil & Weinkauf

(57) ABSTRACT

A catalyst system comprises a) a cocatalytically active chemical compound A, b) at least one metallocene B and c) an aluminum compound C.

5 Claims, No Drawings

CATALYST SYSTEM

The present invention relates to a catalyst system comprising a chemical compound having cocatalytic activity in combination with a metallocene and an aluminum compound. The cocatalytically active chemical compound is uncharged and has a plurality of Lewis acid centers. The catalyst system can advantageously be used for the polymerization of olefins. Here, the use of aluminoxanes such as methylaluminoxane (MAO) as cocatalyst can be dispensed with while still achieving high catalyst activities. The catalyst system can be used either in homogeneous form or supported form for the polymerization.

The role of cationic complexes in Ziegler-Natta polymerization using metallocenes is generally known (H. H. Brintzinger, D. Fischer, R. Mülhaupt, R. Rieger, R. Waymouth, Angew. Chem. 1995, 107, 1255–1283). MAO as cocatalyst has the disadvantage of being used in a high excess. The preparation of cationic alkyl complexes opens up the route to MAO-free catalysts which have comparable activity and in which the cocatalyst can be used in an almost stoichiometric amount.

The synthesis of "cation-like" metallocene polymerization catalysts is described in J. Am. Chem. Soc. 1991, 113, 3623. Here, abstraction of an alkyl group from an alkyl-metallocene compound is achieved by means of trispentafluorophenylborane. EP 427 697 describes this synthetic principle and a corresponding catalyst system comprising an uncharged metallocene species (e.g. $Cp_2ZrMe_2$), a Lewis acid (e.g. $B(C_6F_5)_3$) and aluminum alkyls. A process for preparing salts of the formula $LMX^+XA^-$ by the above-described principle is described in EP 520 732.

EP 558 158 describes zwitterionic catalyst systems which are prepared from dialkyl-metallocene compounds and salts of the formula $[R_3NH]^+ [B(C_6H_5)_4]^-$. The reaction of such a salt with, for example, $Cp_2ZrMe_2$ results in protolysis with elimination of methane to give a methyl-zirconocene cation as intermediate. This reacts via C—H activation to form the zwitterion $Cp_2Zr^+$—(m—$C_6H_4$)—$BPh_3^-$. In this compound, the Zr atom is covalently bound to a carbon atom of the phenyl ring and is stabilized via agostic hydrogen bonds. U.S. Pat. No. 5,348,299 describes zwitterionic catalyst systems which are prepared from dialkyl-metallocene compounds and salts of the formula $[R_3NH]^+ [B(C_6F_5)_4]^-$ by protolysis. The C—H activation as subsequent reaction does not occur. EP 426 637 utilizes a process in which the Lewis acid $CPh_3^+$ cation is used for abstracting the methyl group from the metal center. The function of the weakly coordinating anion is likewise fulfilled by $B(C_6F_5)_4^-$.

Disadvantages of the catalyst systems known hitherto are the high sensitivity toward catalyst poisons and the problem of leaching in application of the catalyst systems to a support.

It is an object of the present invention to provide an alternative catalyst system which avoids the disadvantages of the prior art and nevertheless achieves high polymerization activities.

We have found that this object is achieved by a catalyst system comprising a) at least one cocatalytically active chemical compound A, b) at least one metallocene B and c) at least one aluminum compound C, and also by a process for preparing this catalyst system. The catalyst system can be used both for the homogeneous polymerization and the heterogeneous polymerization of olefins. In the heterogeneous polymerization, additional use is made of a support material which may have been pretreated. In addition, a process for preparing polyolefins in the presence of the catalyst system of the present invention is described.

The catalyst system of the present invention comprises as cocatalytically active chemical compound A an organoboron-aluminum compound comprising units of the formula I

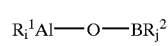

where $R^1$ are identical or different and are each a hydrogen atom, a halogen atom, a $C_1$–$C_{40}$-group such as $C_1$–$C_{20}$-alkyl, $C_1$–$C_{20}$-haloalkyl, $C_1$–$C_{10}$-alkoxy, $C_6$–$C_{20}$-aryl, $C_6$–$C_{20}$-haloaryl, $C_6$–$C_{20}$-aryloxy, $C_7$–$C_{40}$-arylalkyl, $C_7$–$C_{40}$-haloarylalkyl, $C_7$–$C_{40}$-alkylaryl or $C_7$–$C_{40}$-haloalkylaryl or $R^1$ can be an $OSiR_3^3$ group, where $R^3$ are identical or different and are each a hydrogen atom, a halogen atom, a $C_1$–$C_{40}$-group such as $C_1$–$C_{20}$-alkyl, $C_1$–$C_{20}$-haloalkyl, $C_1$–$C_{10}$-alkoxy, $C_6$–$C_{20}$-aryl, $C_6$–$C_{20}$-haloaryl, $C_6$–$C_{20}$-aryloxy, $C_7$–$C_{40}$-arylalkyl, $C_7$–$C_{40}$-haloarylalkyl, $C_7$–$C_{40}$-alkylaryl or $C_7$–$C_{40}$-haloalkylaryl, $R^2$ is a hydrogen atom, a halogen atom, a $C_1$–$C_{40}$-group such as $C_1$–$C_{20}$-alkyl, $C_1$–$C_{20}$-haloalkyl, $C_1$–$C_{10}$-alkoxy, $C_6$–$C_{20}$-aryl, $C_6$–$C_{20}$-haloaryl, $C_6$–$C_{20}$-aryloxy, $C_7$–$C_{40}$-arylalkyl, $C_7$–$C_{40}$-haloarylalkyl, $C_7$–$C_{40}$-alkylaryl or $C_7$–$C_{40}$-haloalkylaryl or $R^2$ can be an $OSiR_3^3$ group, where $R^3$ are identical or different and are each a hydrogen atom, a halogen atom, a $C_1$–$C_{40}$-group such as $C_1$–$C_{20}$-alkyl, $C_1$–$C_{20}$-haloalkyl, $C_1$–$C_{10}$-alkoxy, $C_6$–$C_{20}$-aryl, $C_6$–$C_{20}$-haloaryl, $C_6$–$C_{20}$-aryloxy, $C_7$–$C_{40}$-arylalkyl, $C_7$–$C_{40}$-haloarylalkyl, $C_7$–$C_{40}$-alkylaryl or $C_7$–$C_{40}$-haloalkylaryl, i is 0, 1 or 2, and j is 0 or 1.

The chemical compound A comprising units of the formula I can be in the form of a monomer or a linear, cyclic or cage-like oligomer in which i are identical or different and are 0, 1 or 2 and j is 0 or 1. It is also possible for two or more chemical compounds comprising units of the formula I to form dimers, trimers or higher associates by means of Lewis acid-base interactions with one another.

Preference is given to cocatalytically active chemical compounds A of the formula VI

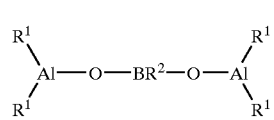

where $R^1$ are identical or different and are each a hydrogen atom, a halogen atom, a $C_1$–$C_{40}$-group such as $C_1$–$C_{20}$-alkyl, $C_1$–$C_{20}$-haloalkyl, $C_1$–$C_{10}$-alkoxy, $C_6$–$C_{20}$-aryl, $C_6$–$C_{20}$-haloaryl, $C_6$–$C_{20}$-aryloxy, $C_7$–$C_{40}$-arylalkyl, $C_7$–$C_{40}$-haloarylalkyl, $C_7$–$C_{40}$-alkylaryl or $C_7$–$C_{40}$-haloalkylaryl or $R^1$ can be an $OSiR_3^3$ group, where $R^3$ are identical or different and are each a hydrogen atom, a halogen atom, a $C_1$–$C_{40}$-group such as $C_1$–$C_{20}$-alkyl, $C_1$–$C_{20}$-haloalkyl, $C_1$–$C_{10}$-alkoxy, $C_6$–$C_{20}$-aryl, $C_6$–$C_{20}$-haloaryl, $C_6$–$C_{20}$-aryloxy, $C_7$–$C_{40}$-arylalkyl, $C_7$–$C_{40}$-haloarylalkyl, $C_7$–$C_{40}$-alkylaryl or $C_7$–$C_{40}$-haloalkylaryl, $R^2$ is a hydrogen atom, a halogen atom, a $C_1$–$C_{40}$-group such as $C_1$–$C_{20}$-alkyl, $C_1$–$C_{20}$-haloalkyl, $C_1$–$C_{10}$-alkoxy, $C_6$–$C_{20}$-aryl, $C_6$–$C_{20}$-haloaryl, $C_6$–$C_{20}$-aryloxy, $C_7$–$C_{40}$-arylalkyl, $C_7$–$C_{40}$-haloarylalkyl, $C_7$–$C_{40}$-alkylaryl or $C_7$–$C_{40}$-haloalkylaryl or $R^2$ can be an $OSiR_3^3$ group, where $R^3$ are identical or different and are each a hydrogen atom, a halogen atom, a $C_1$–$C_{40}$-group such as $C_1$–$C_{20}$-alkyl, $C_1$–$C_{20}$-haloalkyl, $C_1$–$C_{10}$-alkoxy, $C_6$–$C_{20}$-aryl, $C_6$–$C_{20}$-haloaryl, $C_6$–$C_{20}$-aryloxy, $C_7$–$C_{40}$-arylalkyl, $C_7$–$C_{40}$-haloarylalkyl, $C_7$–$C_{40}$-alkylaryl or $C_7$–$C_{40}$-haloalkylaryl.

Cocatalytically active chemical compounds A are obtainable by reacting dihydroxyorganoboranes of the formula III or triorganoboroxins of the formula IV with organoaluminum compounds of the formula V.

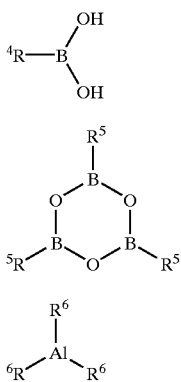

In these formulae, $R^4$ is a halogen atom, a $C_1$–$C_{40}$-group such as $C_1$–$C_{20}$-alkyl, $C_1$–$C_{20}$-haloalkyl, $C_1$–$C_{10}$-alkoxy, $C_6$–$C_{20}$-aryl, $C_6$–$C_{20}$-haloaryl, $C_6$–$C_{20}$-aryloxy, $C_7$–$C_{40}$-arylalkyl, $C_7$–$C_{40}$-haloarylalkyl, $C_7$–$C_{40}$-alkylaryl or $C_7$–$C_{40}$-haloalkylaryl or $R^4$ can be an $OSiR_3^3$ group, where $R^3$ are identical or different and are each a hydrogen atom, a halogen atom, a $C_1$–$C_{40}$-group such as $C_1$–$C_{20}$-alkyl, $C_1$–$C_{20}$-haloalkyl, $C_1$–$C_{10}$-alkoxy, $C_6$–$C_{20}$-aryl, $C_6$–$C_{20}$-haloaryl, $C_6$–$C_{20}$-aryloxy, $C_7$–$C_{40}$-arylalkyl, $C_7$–$C_{40}$-haloarylalkyl, $C_7$–$C_{40}$-alkylaryl or $C_7$–$C_{40}$-haloalkylaryl. Preference is here given to, for example, the following radicals: pentafluorophenyl, 3,5-bis(trifluoromethyl)phenyl, phenyl, methyl, ethyl, propyl, butyl, 3,4,5-trifluorophenyl, 3,5-difluorophenyl, 4-methylphenyl, 4-tert-butylphenyl, 3,5-dimethylphenyl, 2,3-dimethylphenyl, 2-methylphenyl or 4-(trifluoromethyl)phenyl. Particular preference is given to the pentafluorophenyl, phenyl and 4-methylphenyl radicals.

The radicals $R^5$ can be identical or different and can each be a halogen atom, a $C_1$–$C_{40}$-group such as $C_1$–$C_{20}$-alkyl, $C_1$–$C_{20}$-haloalkyl, $C_1$–$C_{10}$-alkoxy, $C_6$–$C_{20}$-aryl, $C_6$–$C_{20}$-haloaryl, $C_6$–$C_{20}$-aryloxy, $C_7$–$C_{40}$-arylalkyl, $C_7$–$C_{40}$haloarylalkyl, $C_7$–$C_{40}$-alkylaryl or $C_7$–$C_{40}$-haloalkylaryl or $R^5$ can be an $OSiR_3^3$ group, where $R^3$ are identical or different and are each a hydrogen atom, a halogen atom, a $C_1$–$C_{40}$-group such as $C_1$–$C_{20}$-alkyl, $C_1$–$C_{20}$-haloalkyl, $C_1$–$C_{10}$-alkoxy, $C_6$–$C_{20}$-aryl, $C_6$–$C_{20}$-haloaryl, $C_6$–$C_{20}$-aryloxy, $C_7$–$C_{40}$-arylalkyl, $C_7$–$C_{40}$-haloarylalkyl, $C_7$–$C_{40}$-alkylaryl or $C_7$–$C_{40}$-haloalkylaryl. Preference is here given to, for example, the following radicals: pentafluorophenyl, 3,5-bis(trifluoromethyl)phenyl, phenyl, methyl, ethyl, propyl, butyl, 3,4,5-trifluorophenyl, 3,5-difluorophenyl, 4-methylphenyl, 4-tert-butylphenyl, 3,5-dimethylphenyl, 2,3-dimethylphenyl, 2-methylphenyl or 4-(trifluoromethyl)phenyl. Particular preference is given to the pentafluorophenyl, phenyl and 4-methylphenyl radicals.

The radicals $R^6$ can be identical or different and can each be a halogen atom, a hydrogen atom, a $C_1$–$C_{40}$-group such as $C_1$–$C_{20}$-alkyl, $C_1$–$C_{20}$-haloalkyl, $C_6$–$C_{20}$-aryl, $C_6$–$C_{20}$-haloaryl, $C_7$–$C_{40}$-arylalkyl, $C_7$–$C_{40}$-haloarylalkyl, $C_7$–$C_{40}$-alkylaryl or $C_7$–$C_{40}$-haloalkylaryl. Preferred $R^6$ are $C_1$–$C_6$-alkyl groups, particularly preferably $C_1$–$C_4$-alkyl groups.

To prepare the cocatalytically active chemical compound A, one or more compounds of the formula III or IV can be reacted with one or more compounds of the formula V in any desired stoichiometric ratio. Preference is given to using from 2 to 6 equivalents of a compound of the formula V per 1 equivalent of a compound of the formula III or IV. Particular preference is given to using from 2 to 2.5 equivalents of a compound of the formula V per 1 equivalent of a compound of the formula III or IV.

The reaction is carried out in an aliphatic or aromatic solvent such as toluene, heptane, tetrahydrofuran or diethyl ether. It is also possible to use solvent mixtures.

The cocatalytically active chemical compound of the formula I can be isolated or reacted further in solution without isolation. For the purposes of the present invention, the term solution or solvent includes suspensions or suspension media, i.e. both the starting materials used in the process of the present invention and the products obtained can be partly or completely dissolved or partly or completely suspended.

The metallocenes B present in the catalyst system of the present invention can be, for example, bridged or unbridged biscyclopentadienyl complexes as are described, for example, in EP 129 368, EP 561 479, EP 545 304 and EP 576 970, monocyclopentadienyl complexes such as the bridged amidocyclopentadienyl complexes described, for example, in EP 416 815, multinuclear cyclopentadienyl complexes as described in EP 632 063, π-ligand-substituted tetrahydropentalenes as described in EP 659 758 or π-ligand-substituted tetrahydroindenes as described in EP 661 300.

It is also possible to use organometallic compounds in which the complexing ligand contains no cyclopentadienyl ligand. Examples of such compounds are diamine complexes of transition groups III and IV of the Periodic Table of the Elements, as described, for example in D. H. McConville et al., Macromolecules, 1996, 29, 5241 and D. H. McConville et al., J. Am. Chem. So., 1996, 118, 10008. Furthermore, it is possible to use diimine complexes of transition group VIII of the Periodic Table of the Elements (e.g. $Ni^{2+}$ or $Pd^{2+}$ complexes), as are described in Brookhart et al., J. Am. Chem. So., 1995, 117, 6414 and Brookhart et al., J. Am. Chem. So., 1996, 118, 267. It is also possible to use 2,6-bis(imino)pyridyl complexes of transition group VIII of the Periodic Table of the Elements (e.g. $Co^{2+}$ or $Fe^+$ complexes), as are described in Brookhart et al., J. Am. Chem. So., 1998, 120, 4049 and Gibson et al., Chem. Commun. 1998, 849.

Preferred metallocene compounds are unbridged or bridged compounds of the formula II, (II)

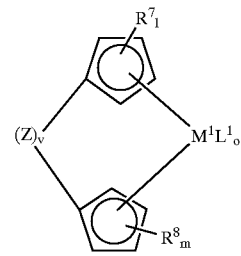

where
$M^1$ is a metal of transition group III, IV, V or VI of the Periodic Table of the Elements, in particular Ti, Zr or Hf, R⁷ are identical or different and are each a hydrogen atom or SiR₃¹², where R¹² are identical or different and are each a hydrogen atom or a $C_1$–$C_{40}$-group such as $C_1$–$C_{20}$-alkyl, $C_1$–$C_{10}$-fluoroalkyl, $C_1$–$C_{10}$-alkoxy, $C_6$–$C_{20}$-aryl, $C_6$–$C_{10}$-fluoroaryl, $C_6$–$C_{10}$-aryloxy, $C_2$–$C_{10}$-alkenyl, $C_7$–$C_{40}$-arylalkyl, $C_7$–$C_{40}$-alkylaryl or $C_8$–$C_{40}$-arylalkenyl, or R⁷ are each a $C_1$–$C_{30}$-group such as $C_1$–$C_{25}$-alkyl, e.g. methyl, ethyl, tert-butyl, cyclohexyl or octyl, $C_2$–$C_{25}$-alkenyl, $C_3$–$C_{15}$-alkylalkenyl, $C_6$–$C_{24}$-aryl, $C_5$–$C_{24}$-heteroaryl such as pyridyl, furyl or quinolyl, $C_7$–$C_{30}$-arylalkyl, $C_7$–$C_{30}$-alkylaryl, fluorinated $C_1$–$C_{25}$-alkyl, fluorinated $C_6$–$C_{24}$-aryl, fluorinated $C_7$–$C_{30}$-arylalkyl, fluorinated $C_7$–$C_{30}$-alkylaryl or $C_1$–$C_{12}$-alkoxy, or two or more radicals R⁷ can be joined to one another in such a way that the radicals R⁷ and the atoms of the cyclopentadienyl ring which connect them form a $C_4$–$C_{24}$-ring system which may in turn be substituted, R⁸ are identical or different and are each a hydrogen atom or SiR₃¹², where R¹² are identical or different and are each a hydrogen atom or a $C_1$–$C_{40}$-group such as $C_1$–$C_{20}$-alkyl, $C_1$–$C_{10}$-fluoroalkyl, $C_1$–$C_{10}$-alkoxy, $C_6$–$C_{14}$-aryl, $C_6$–$C_{10}$-fluoroaryl, $C_6$–$C_{10}$-aryloxy, $C_2$–$C_{10}$-alkenyl, $C_7$–$C_{40}$-arylalkyl, $C_7$–$C_{40}$-alkylaryl or $C_8$–$C_{40}$-arylalkenyl, or R⁸ are each a $C_1$–$C_{30}$-group such as $C_1$–$C_{25}$-alkyl, e.g. methyl, ethyl, tert-butyl, cyclohexyl or octyl, $C_2$–$C_{25}$-alkenyl, $C_3$–$C_{15}$-alkylalkenyl, $C_6$–$C_{24}$-aryl, $C_5$–$C_{24}$-heteroaryl, e.g. pyridyl, furyl or quinolyl, $C_7$–$C_{30}$-arylalkyl, $C_7$–$C_{30}$-alkylaryl, fluorinated $C_1$–$C_{25}$-alkyl, fluorinated $C_6$–$C_{24}$-aryl, fluorinated $C_7$–$C_{30}$-arylalkyl, fluorinated $C_7$–$C_{30}$-alkylaryl or $C_1$–$C_{12}$-alkoxy, or two or more radicals R⁸ can be joined to one another in such a way that the radicals R⁸ and the atoms of the cyclopentadienyl ring which connect them form a $C_4$–$C_{24}$-ring system which may in turn be substituted, l is 5 when v=0, and l is 4 when v=1, m is 5 when v=0, and m is 4 when v=1, L¹ can be identical or different and are each a hydrogen atom, a $C_1$–$C_{10}$-hydrocarbon group such as $C_1$–$C_{10}$-alkyl or $C_6$–$C_{10}$-aryl, a halogen atom or OR⁹, SR⁹, OSiR₃⁹, SiR₃⁹, PR₂⁹ or NR₂⁹, where R⁹ is a halogen atom, a $C_1$–$C_{10}$-alkyl group, a halogenated $C_1$–$C_{10}$-alkyl group, a $C_6$–$C_{20}$-aryl group or a halogenated $C_6$–$C_{20}$-aryl group, or L¹ are each a toluenesulfonyl, trifluoroacetyl, trifluoroacetoxyl, trifluoromethanesulfonyl, nonafluorobutanesulfonyl or 2,2,2-trifluoroethanesulfonyl group, o is an integer from 1 to 4, preferably 2, Z is a bridging structural element between the two cyclopentadienyl rings and v is 0 or 1.

Examples of Z are M²R¹⁰R¹¹ groups, where M² is carbon, silicon, germanium or tin and R¹⁰ and R¹¹ are identical or different and are each a $C_1$–$C_{20}$-hydrocarbon group such as $C_1$–$C_{10}$-alkyl, $C_6$–$C_{14}$-aryl or trimethylsilyl. Z is preferably $CH_2$, $CH_2CH_2$, $CH$ $(CH_3)CH_2$, $CH(C_4H_9)C(CH_3)_2$, $C(CH_3)_2$, $(CH_3)_2Si$, $(CH_3)_2Ge$, $(CH_3)_2Sn$, $(C_6H_5)_2Si$, $(C_6H_5)$ $(CH_3)Si$, $(C_6H_5)_2Ge$, $(C_6H_5)_2Sn$, $(CH_2)_4Si$, $CH_2Si$ $(CH_3)_2$, $o$-$C_6H_4$ or $2,2'$-$(C_6H_4)_2$. Z together with one or more radicals R⁷ and/or R⁸ can also form a monocyclic or polycyclic ring system.

Preference is given to chiral bridged metallocene compounds of the formula II, in particular those in which v is 1 and one or both cyclopentadienyl rings are substituted in such a way that they form an indenyl ring. The indenyl ring is preferably substituted, in particular in the 2 position, 4 position, 2,4,5 positions, 2,4,6 positions, 2,4,7 positions or 2,4,5,6 positions, by $C_1$–$C_{20}$-groups such as $C_1$–$C_{10}$-alkyl or $C_6$–$C_{20}$-aryl, where two or more substituents of the indenyl ring can also together form a ring system.

Chiral bridged metallocene compounds of the formula II can be used as pure racemic compounds or pure meso compounds. However, it is also possible to use mixtures of a racemic compound and a meso compound.

Examples of metallocene compounds are:

dimethylsilanediylbis(indenyl)zirconium dichloride
dimethylsilanediylbis(4-naphthylindenyl)zirconium dichloride
dimethylsilanediylbis(2-methylbenzoindenyl)zirconium dichloride
dimethylsilanediylbis(2-methylindenyl)zirconium dichloride
dimethylsilanediylbis(2-methyl-4-(1-naphthyl)indenyl) zirconium dichloride
dimethylsilanediylbis(2-methyl-4-(2-naphthyl)indenyl) zirconium dichloride
dimethylsilanediylbis(2-methyl-4-phenylindenyl)zirconium dichloride
dimethylsilanediylbis(2-methyl-4-t-butylindenyl)zirconium dichloride
dimethylsilanediylbis(2-methyl-4-isopropylindenyl) zirconium dichloride
dimethylsilanediylbis(2-methyl-4-ethylindenyl)zirconium dichloride
dimethylsilanediylbis(2-methyl-4-acenaphthindenyl) zirconium dichloride
dimethylsilanediylbis(2,4-dimethylindenyl)zirconium dichloride
dimethylsilanediylbis(2-ethylindenyl)zirconium dichloride
dimethylsilanediylbis(2-ethyl-4-ethylindenyl)zirconium dichloride
dimethylsilanediylbis(2-ethyl-4-phenylindenyl)zirconium dichloride
dimethylsilanediylbis(2-methyl-4,5-benzoindenyl) zirconium dichloride
dimethylsilanediylbis(2-methyl-4,6-diisopropylindenyl) zirconium dichloride
dimethylsilanediylbis(2-methyl-4,5-diisopropylindenyl) zirconium dichloride
dimethylsilanediylbis(2,4,6-trimethylindenyl)zirconium dichloride
dimethylsilanediylbis(2,5,6-trimethylindenyl)zirconium dichloride
dimethylsilanediylbis(2,4,7-trimethylindenyl)zirconium dichloride
dimethylsilanediylbis(2-methyl-5-isobutylindenyl) zirconium dichloride
dimethylsilanediylbis(2-methyl-5-t-butylindenyl)zirconium dichloride
methyl(phenyl)silanediylbis(2-methyl-4-phenylindenyl) zirconium dichloride
methyl(phenyl)silanediylbis(2-methyl-4,6-diisopropylindenyl)zirconium dichloride
methyl(phenyl)silanediylbis (2-methyl-4-isopropylindenyl) zirconium dichloride
methyl(phenyl)silanediylbis(2-methyl-4,5-benzoindenyl) zirconium dichloride
methyl(phenyl)silanediylbis(2-methyl-4,5-(methylbenzo) indenyl)zirconium dichloride
methyl(phenyl)silanediylbis(2-methyl-4,5-(tetramethylbenzo)indenyl)zirconium dichloride
methyl(phenyl)silanediylbis(2-methyl-4-acenaphthindenyl) zirconium dichloride methyl(phenyl)silanediylbis(2-methylindenyl)zirconium dichloride
methyl(phenyl)silanediylbis(2-methyl-5-isobutylindenyl) zirconium dichloride
1,2-ethanediylbis(2-methyl-4-phenylindenyl)zirconium dichloride
1,4-butanediylbis(2-methyl-4-phenylindenyl)zirconium dichloride
1,2-ethanediylbis(2-methyl-4,6-diisopropylindenyl) zirconium dichloride
1,4-butanediylbis(2-methyl-4-isopropylindenyl)zirconium dichloride
1,4-butanediylbis(2-methyl-4,5-benzoindenyl)zirconium dichloride
1,2-ethanediylbis(2-methyl-4,5-benzoindenyl)zirconium dichloride
1,2-ethanediylbis(2,4,7-trimethylindenyl)zirconium dichloride
1,2-ethanediylbis(2-methylindenyl)zirconium dichloride
1,4-butanediylbis(2-methylindenyl)zirconium dichloride
[4-($\eta^5$-cyclopentadienyl)-4,6,6-trimethyl($\eta^5$-4,5-tetrahydropentalene)]dichlorozirconium
[4- ($\eta^5$-3'-trimethylsilylcyclopentadienyl)-4,6,6-trimethyl ($\eta^5$-4,5-tetrahydropentalene)]dichlorozirconium
[4-($\eta^5$-3'-isopropylcyclopentadienyl)-4,6,6-trimethyl($\eta^5$-4,5-tetrahydropentalene)]dichlorozirconium
[4-($\eta^5$-cyclopentadienyl)-4,7,7-trimethyl($\eta^5$-4,5,6,7-tetrahydroindenyl)]dichlorotitanium
[4-($\eta^5$-cyclopentadienyl)-4,7,7-trimethyl($\eta^5$-4,5,6,7-tetrahydroindenyl)]dichlorozirconium
[4-($\eta^5$-cyclopentadienyl)-4,7,7-trimethyl($\eta^5$-4,5,6,7-tetrahydroindenyl)]dichlorohafnium
[4-($\eta^5$-3'-tert-butylcyclopentadienyl)-4,7,7-trimethyl($\eta^5$-4,5,6,7-tetrahydroindenyl)]-dichlorotitanium
4-($\eta^5$-3'-isopropylcyclopentadienyl)-4,7,7-trimethyl($\eta^5$-4,5,6,7-tetrahydroindenyl)]dichlorotitanium
4-($\eta^5$-3'-methylcyclopentadienyl)-4,7,7-trimethyl($\eta^5$-4,5,6,7-tetrahydroindenyl)]dichlorotitanium
4-($\eta^5$-3-trimethylsilylcyclopentadienyl)-2-trimethylsilyl-4,7,7-trimethyl($\eta^5$-4,5,6,7-tetrahydroindenyl)]dichlorotitanium
4-($\eta^5$-3'-tert-butylcyclopentadienyl)4,7,7-trimethyl($\eta^5$-4,5,6,7-tetrahydroindenyl)]dichlorozirconium
(tert-butylamido)(tetramethyl-$\eta^5$-cyclopentadienyl) dimethylsilyldichlorotitanium
(tert-butylamido)(tetramethyl-$\eta^5$-cyclopentadienyl)-1,2-ethanediyldichlorotitanium
(methylamido)(tetramethyl-$\eta^5$-cyclopentadienyl) dimethylsilyldichlorotitanium
(methylamido)(tetramethyl-$\eta^5$-cyclopentadienyl)-1,2-ethanediyldichlorotitanium
(tert-butylamido)(2,4-dimethyl-2,4-pentadien-1-yl) dimethylsilyldichlorotitanium
bis-(cyclopentadienyl)zirconium dichloride
bis-(n-butylcyclopentadienyl)zirconium dichloride
bis-(1,3-dimethylcyclopentadienyl)zirconium dichloride
tetrachloro-[1-[bis($\eta^5$-1H-inden-1-ylidene)methylsilyl]-3-$\eta^5$-cyclopenta-2,4-dien-1-ylidene)-3-$\eta^5$-9H-fluoren-9-ylidene)butane]dizirconium
tetrachloro-[2-[bis($\eta^5$-2-methyl-1H-inden-1-ylidene) methoxysilyl]-5-($\eta^5$-2,3,4,5-tetramethylcyclopenta-2,4-dien-1-ylidene)-5-($\eta^5$-9H-fluoren-9-ylidene)hexane) dizirconium
tetrachloro-[1-[bis($\eta^5$-1H-inden-1-ylidene)methylsilyl]-6-($\eta^5$-cyclopenta-2,4-dien-1-ylidene)-6-($\eta^5$-9H-fluoren-9-ylidene)-3-oxaheptane]dizirconium
dimethylsilanediylbis(2-methyl-4-(tert-butylphenylindenyl) zirconium dichloride
dimethylsilanediylbis(2-methyl-4-(4-methylphenylindenyl) zirconium dichloride
dimethylsilanediylbis(2-methyl-4-(4-ethylphenylindenyl) zirconium dichloride
dimethylsilanediylbis(2-methyl-4-(4-trifluoromethylphenylindenyl)zirconium dichloride
dimethylsilanediylbis(2-methyl-4-(4-methoxyphenylindenyl)zirconium dichloride
dimethylsilanediylbis(2-ethyl-4(4-tert-butylphenylindenyl) zirconium dichloride
dimethylsilanediylbis(2-ethyl-4-(4-methylphenylindenyl) zirconium dichloride
dimethylsilanediylbis(2-ethyl-4-(4-ethylphenylindenyl) zirconium dichloride
dimethylsilanediylbis(2-ethyl-4-(4-trifluoromethylphenylindenyl)zirconium dichloride
dimethylsilanediylbis(2-ethyl-4-(4-methoxyphenylindenyl) zirconium dichloride
dimethylsilanediylbis(2-methyl-4-(4-tert-butylphenylindenyl)dimethylzirconium
dimethylsilanediylbis(2-methyl-4-(4-methylphenylindenyl) dimethylzirconium
dimethylsilanediylbis(2-methyl-4-(4-ethylphenylindenyl) dimethylzirconium
dimethylsilanediylbis(2-methyl-4-(4-trifluoromethylphenylindenyl)dimethylzirconium
dimethylsilanediylbis(2-methyl-4-(4-methoxyphenylindenyl)dimethylzirconium
dimethylsilanediylbis(2-ethyl-4-(4-tert-butylphenylindenyl) dimethylzirconium
dimethylsilanediylbis(2-ethyl-4-(4-methylphenylindenyl) dimethylzirconium
dimethylsilanediylbis(2-ethyl-4-(4-ethylphenylindenyl) diethylzirconium
dimethylsilanediylbis(2-ethyl-4-(4-trifluoromethylphenylindenyl)dimethylzirconium
dimethylsilanediylbis(2-ethyl-4-(4-methoxyphenylindenyl) dimethylzirconium
dimethylsilanediylbis(2-methyl-4-(4'-tert-butylphenyl) indenyl)hafnium dichloride
dimethylsilanediylbis(2-methyl-4-(4'-tert-butylphenyl) indenyl)titanium dichloride
dimethylsilanediylbis(2-methyl-4-(4'-n-propylphenyl) indenyl)zirconium dichloride
dimethylsilanediylbis(2-methyl-4-(4'-isopropylphenyl) indenyl)zirconium dichloride
dimethylsilanediylbis(2-methyl-4-(4'-n-butylphenyl) indenyl)zirconium dichloride
dimethylsilanediylbis(2-methyl-4-(4'-hexylphenyl)indenyl) zirconium dichloride
dimethylsilanediylbis(2-methyl-4-(4'-sec-butylphenyl) indenyl)zirconium dichloride
dimethylsilanediylbis(2-ethyl-4-(4'-n-propylphenyl) indenyl)zirconium dichloride
dimethylsilanediylbis(2-ethyl-4-(4'-isopropylphenyl) indenyl)zirconium dichloride
dimethylsilanediylbis(2-ethyl-4-(4'-n-butylphenyl)indenyl) zirconium dichloride
dimethylsilanediylbis(2-ethyl-4-(4'-hexylphenyl)indenyl) zirconium dichloride
dimethylsilanediylbis(2-ethyl-4-(4'-pentylphenyl)indenyl) zirconiumdichloride
dimethylsilanediylbis(2-ethyl-4-(4'-cyclohexylphenyl) indenyl)zirconium dichloride
dimethylsilanediylbis(2-ethyl-4-(4'-sec-butylphenyl) indenyl)zirconium dichloride
dimethylsilanediylbis(2-n-propyl-4-phenyl)indenyl) zirconium dichloride dimethylsilanediylbis(2-n-propyl-4-(4'-methylphenyl)indenyl)zirconium dichloride
dimethylsilanediylbis(2-n-propyl-4-(4'-ethylphenyl)indenyl)zirconium dichloride
dimethylsilanediylbis(2-n-propyl-4-(4'-n-propylphenyl)indenyl)zirconium dichloride
dimethylsilanediylbis(2-n-propyl-4-(4'-isopropylphenyl)indenyl)zirconium dichloride
dimethylsilanediylbis(2-n-propyl-4-(4'-n-butylphenyl)indenyl)zirconium dichloride
dimethylsilanediylbis(2-n-propyl-4-(4'-hexylphenyl)indenyl)zirconium dichloride
dimethylsilanediylbis(2-n-propyl-4-(4'-cyclohexylphenyl)indenyl)zirconium dichloride
dimethylsilanediylbis(2-n-propyl-4-(4'-sec-butylphenyl)indenyl)zirconium dichloride
dimethylsilanediylbis(2-n-propyl-4-(4'-tert-butylphenyl)indenyl)zirconium dichloride
dimethylsilanediylbis(2-n-butyl-4-phenyl)indenyl)zirconium dichloride
dimethylsilanediylbis(2-n-butyl-4-(4'-methylphenyl)indenyl)zirconium dichloride
dimethylsilanediylbis(2-n-butyl-4-(4'-ethylphenyl)indenyl)zirconium dichloride
dimethylsilanediylbis(2-n-butyl-4-(4'-n-propylphenyl)indenyl)zirconium dichloride
dimethylsilanediylbis(2-n-butyl-4-(4'-isopropylphenyl)indenyl)zirconium dichloride
dimethylsilanediylbis(2-n-butyl-4-(4'-n-butylphenyl)indenyl)zirconium dichloride
dimethylsilanediylbis(2-n-butyl-4-(4'-hexylphenyl)indenyl)zirconium dichloride
dimethylsilanediylbis(2-n-butyl-4-(4'-cyclohexylphenyl)indenyl)zirconium dichloride
dimethylsilanediylbis(2-n-butyl-4-(4'-sec-butylphenyl)indenyl)zirconium dichloride
dimethylsilanediylbis(2-n-butyl-4-(4'-tert-butylphenyl)indenyl)zirconium dichloride
dimethylsilanediylbis(2-hexyl-4-phenyl)indenyl)zirconium dichloride
dimethylsilanediylbis(2-hexyl-4-(4'-methylphenyl)indenyl)zirconium dichloride
dimethylsilanediylbis(2-hexyl-4-(4'-ethylphenyl)indenyl)zirconium dichloride
dimethylsilanediylbis(2-hexyl-4-(4'-n-propylphenyl)indenyl)zirconium dichloride
dimethylsilanediylbis(2-hexyl-4-(4'-isopropylphenyl)indenyl)zirconium dichloride
dimethylsilanediylbis(2-hexyl-4-(4'-n-butylphenyl)indenyl)zirconium dichloride
dimethylsilanediylbis(2-hexyl-4-(4'-hexylphenyl)indenyl)zirconium dichloride
dimethylsilanediylbis(2-hexyl-4-(4'-cyclohexylphenyl)indenyl)zirconium dichloride
dimethylsilanediylbis(2-hexyl-4-(4'-sec-butylphenyl)indenyl)zirconium dichloride
dimethylsilanediylbis(2-hexyl-4-(4'-tert-butylphenyl)indenyl)zirconium dichloride
dimethylsilanediylbis(2-methyl-4-(4'-tert-butylphenyl)indenyl)zirconium bis(dimethylamide)
dimethylsilanediylbis(2-ethyl-4-(4'-tert-butylphenyl)indenyl)dibenzylzirconium
dimethylsilanediylbis(2-methyl-4-(4'-tert-butylphenyl)indenyl)dimethylzirconium
dimethylgermanediylbis(2-ethyl-4-(4'-tert-butylphenyl)indenyl)zirconium dichloride
dimethylgermanediylbis(2-ethyl-4-(4'-tert-butylphenyl)indenyl)hafnium dichloride
dimethylgermanediylbis(2-propyl-4-(4'-tert-butylphenyl)indenyl)titanium dichloride
dimethylgermanediylbis(2-methyl-4-(4'-tert-butylphenyl)indenyl)zirconium dichloride
ethylidenebis(2-ethyl-4-phenyl)indenyl)zirconium dichloride
ethylidenebis(2-ethyl-4-(4'-tert-butylphenyl)indenyl)zirconium dichloride
ethylidenebis(2-n-propyl-4-(4'-tert-butylphenyl)indenyl)zirconium dichloride
ethylidenebis(2-n-butyl-4-(4'-tert-butylphenyl)indenyl)titanium dichloride
ethylidenebis(2-hexyl-4-(4'-tert-butylphenyl)indenyl)dibenzylzirconium
ethylidenebis(2-ethyl-4-(4'-tert-butylphenyl)indenyl)dibenzylhafnium
ethylidenebis(2-methyl-4-(4'-tert-butylphenyl)indenyl)dibenzyltitanium
ethylidenebis(2-methyl-4-(4'-tert-butylphenyl)indenyl)zirconium dichloride
ethylidenebis(2-ethyl-4-(4'-tert-butylphenyl)indenyl)dimethylhafnium
ethylidenebis(2-n-propyl-4-phenyl)indenyl)dimethyltitanium
ethylidenebis(2-ethyl-4-(4'-tert-butylphenyl)indenyl)zirconium bis(dimethylamide)
ethylidenebis(2-ethyl-4-(4'-tert-butylphenyl)indenyl)hafnium bis(dimethylamide)
ethylidenebis(2-ethyl-4-(4'-tert-butylphenyl)indenyl)titanium bis(dimethylamide)
methylethylidenebis(2-ethyl-4-(4'-tert-butylphenyl)indenyl)zirconium dichloride
methylethylidenebis(2-ethyl-4-(4'-tert-butylphenyl)indenyl)hafnium dichloride
phenylphosphinediyl(2-ethyl-4-(4'-tert-butylphenyl)indenyl)zirconium dichloride
phenylphosphinediyl(2-methyl-4-(4'-tert-butylphenyl)indenyl)zirconium dichloride
phenylphosphinediyl(2-ethyl-4-(4'-tert-butylphenyl)indenyl)zirconium dichloride Preference is also given to the corresponding dimethyl zirconium compounds and the corresponding zirconium-$\eta^4$-butadiene compounds, and also the corresponding compounds containing 1,2-(1-methylethanediyl),1,2-(1,1-dimethylethanediyl) and 1,2-(1,2-dimethylethanediyl) bridges.

The catalyst system of the present invention further comprises an aluminum compound C which likewise preferably corresponds to the formula V.

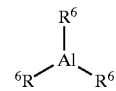

V

The radicals $R^6$ in formula V can be identical or different and can each be a halogen atom, a hydrogen atom, a $C_1$–$C_{40}$-group such as $C_1$–$C_{20}$-alkyl, $C_1$–$C_{20}$-haloalkyl, $C_6$–$C_{20}$-aryl, $C_6$–$C_{20}$-haloaryl, $C_7$–$C_{40}$-arylalkyl, $C_7$–$C_{40}$-haloarylalkyl, $C_7$–$C_{40}$-alkylaryl or $C_7$–$C_{40}$-haloalkylaryl. Preferred $R^6$ are $C_1$–$C_6$-alkyl groups, particularly preferably $C_1$–$C_4$-alkyl groups.

The aluminum compound here can be the same as that used for preparing the cocatalytically active compound A, but it can also be different therefrom.

Preferred aluminum compounds C are trimethylaluminum
triethylaluminum
triisopropylaluminum
trihexylaluminum
trioctylaluminum
tri-n-butylaluminum
tri-n-propylaluminum
triisoprenylaluminum
dimethylaluminum monochloride
diethylaluminum monochloride
diisobutylaluminum monochloride
methylaluminum sesquichloride
ethylaluminum sesquichloride
dimethylaluminum hydride
diethylaluminum hydride
diisopropylaluminum hydride
dimethylaluminum trimethylsiloxide
dimethylaluminum triethylsiloxide
phenylalane
pentafluorophenylalane
o-tolylalane Particular preference is given to trimethylaluminum, triethylaluminum and triisobutylaluminum.

The catalyst system of the present invention can be prepared in various ways. The following explanation of the preparation of the catalyst system of the present invention is given using a cocatalytically active compound of the formula VI. However, it is also possible to use all other chemical compounds A comprising units of the formula I. The following preparative methods can, for example, be employed:

To prepare the catalyst system of the present invention, a metallocene of the formula II can be reacted with a compound A and an aluminum compound of the formula V in any desired stoichiometric ratio. Solvents used here are aliphatic or aromatic solvents such as toluene, heptane, tetrahydrofuran or diethyl ether. It is also possible to use solvent mixtures. A possible procedure is dissolving or suspending a compound of the formula II in an aliphatic or aromatic solvent. Subsequently, an organoboron-aluminum compound A is added either as such or in dissolved or suspended form. The reaction time is in the range of from 1 minute to 24 hours, preferably from 5 minutes to 120 minutes. The reaction temperature is in the range from −10° C. to +200° C., preferably from 0° C. to 50° C. A compound of the formula V, either as such or in dissolved or suspended form, is then added. The reaction time is in the range from 1 minute to 24 hours, preferably from 5 minutes to 120 minutes. The reaction temperature is in the range from −10° C. to +200° C., preferably from 0° C. to 50° C. All starting materials can be used in any desired stoichiometric ratio. The reaction is preferably carried out using a stoichiometric ratio of compounds of the formula II: compounds A of from 1:0.1 to 1:200 and of compounds of the formula II:compounds of the formula V of from 1:0.01 to 1:400. Particular preference is given to carrying out the reaction using a stoichiometric ratio of compounds of the formula II:compounds A of from 1:1 to 1:20 and of compounds of the formula II:compounds of the formula V of from 1:1 to 1:10. The order of addition of the individual components can, however, be changed as desired, so that, for example, firstly a compound A, subsequently a compound of the formula V and then a compound of the formula II are added. The resulting catalyst system of the present invention is injected directly into the polymerization autoclave.

The catalyst systems of the present invention can also be used in supported form.

The support preferably comprises at least one inorganic oxide such as silicon oxide, aluminum oxide, zeolites, MgO, $ZrO_2$, $TiO_2$, $B_2O_3$, CaO, ZnO, $ThO_2$, $Na_2CO_3$, $K_2CO_3$, $CaCO_3$, $MgCO_3$, $Na_2SO_4$, $Al_2(SO_4)_3$, $BaSO_4$, $KNO_3$, $Mg(NO_3)_2$, $Al(NO_3)_3$, $Na_2O$, $K_2O$ or $Li_2O$, in particular silicon dioxide and/or aluminum oxide. The support can also comprise at least one polymer, e.g. a homopolymer or copolymer, a crosslinked polymer or polymer blend. Examples of polymers are polyethylene, polypropylene, polybutene, polystyrene, divinylbenzene-crosslinked polystyrene, polyvinyl chloride, acrylonitrile-butadiene-styrene copolymer, polyamide, polymethacrylate, polycarbonate, polyester, polyacetal or polyvinyl alcohol.

The support has a specific surface area in the range from 10 to 1000 $m^2/g$, preferably from 150 to 500 $m^2/g$. The mean particle size of the support is from 1 to 500 µm, preferably from 5 to 350 µm, particularly preferably from 10 to 200 µm.

The support is preferably porous with a pore volume of from 0.5 to 4.0 ml/g, preferably from 1.0 to 3.5 ml/g. A porous support has a certain proportion of voids (pore volume). The shape of the pores is usually irregular, frequently spherical. The pores can be connected to one another by small pore openings. The pore diameter is preferably from about 2 to 50 nm. The particle shape of the porous support is dependent on the after-treatment and can be irregular or spherical. The particle size of the support can be adjusted as desired by, for example, cryogenic milling and/or sieving.

The supported catalyst systems of the present invention can be obtained by various preparative methods. The detailed explanations below are given using a cocatalytically active compound of the formula VI as an example. However, it is also possible to use all other chemical compounds A comprising units A. The following preparative methods can, for example, be employed:

The support is placed in an aliphatic or aromatic solvent such as toluene, heptane, tetrahydrofuran or diethyl ether. A compound A, either as such or in dissolved or suspended form, is subsequently added to the support. The reaction time is in the range from 1 minute to 24 hours, preferably from 5 minutes to 120 minutes. The reaction temperature is in the range from −10° C. to +200° C., preferably from 20° C. to 100° C. Subsequently, an organometallic transition metal compound of the formula II is added as such or in dissolved or suspended form. The reaction time is in the range from 1 minute to 24 hours, preferably from 5 minutes to 120 minutes. The reaction temperature is in the range from −10° C. to +200° C., preferably from 20° C. to 100° C. This is followed by the addition of an organoaluminum compound of the formula V, either as such or in dissolved or suspended form, to the support. Here too, the reaction time is in the range from 1 minute to 24 hours, preferably likewise from 5 to 120 minutes. The reaction temperature is in the range from −10° C. to +200° C., preferably from 20° C. to 100° C. All starting materials can be used in any desired stoichiometric ratio. The reaction is preferably carried out using a stoichiometric ratio of compounds of the formula II:compounds A of from 1:0.1 to 1:200 and of compounds of the formula II:compounds of formula V of from 1:0.01 to 1:400. The reaction is particularly preferably carried out using a stoichiometric ratio of compounds of the formula II:compounds A of from 1:1 to 1:20 and of compounds of the formula II:compounds of the formula V of from 1:1 to 1:10. The order of addition of the individual components can, however, be changed as desired, so that, for example, firstly a compound A, subsequently a compound of the formula V and then a compound of the formula II are added to the support. The supported catalyst system can be used directly for polymerization. However, it is also possible to remove the solvent and use the catalyst system in resuspended form for the polymerization.

A second variant comprises preparing the catalyst system in solution and subsequently reacting it with the support. For this purpose, an organometallic compound of the formula II is placed in an aliphatic or aromatic solvent such as toluene, heptane, tetrahydrofuran or diethyl ether. A compound A is subsequently added either as such or in dissolved or suspended form. The reaction time is in the range from 1 minute to 24 hours, preferably from 5 minutes to 120 minutes. The reaction temperature is in the range from −10° C. to +200° C., preferably from 0° C. to 50° C. This is followed by the addition of an organoaluminum compound of the formula V, either as such or in dissolved or suspended form, to the support. Here too, the reaction time is in the range from 1 minute to 24 hours, preferably from 5 minutes to 120 minutes. The reaction temperature is in the range from −10° C. to +200° C., preferably from 0° C. to 50° C. All starting materials can be used in any desired stoichiometric ratio. The reaction is preferably carried out using a stoichiometric ratio of compounds of the formula II:compounds A of from 1:0.1 to 1:200 and of compounds of the formula II:compounds of the formula V of from 1:0.01 to 1:400. The reaction is particularly preferably carried out using a stoichiometric ratio of compounds of the formula II compounds A of from 1:1 to 1:20 and of compounds of the formula II:compounds of the formula V of from 1:1 to 1:10. Here too, the order of addition of the individual components can be changed as desired, so that, for example, firstly a compound A, subsequently a compound of the formula V and then a compound of the formula II are reacted with one another. The catalyst system prepared in this way is then added to a support in an aliphatic or aromatic solvent such as toluene, heptane, tetrahydrofuran or diethyl ether. The reaction time is in the range from 1 minute to 24 hours, preferably from 5 minutes to 120 minutes. The reaction temperature is in the range from −10° C. to +200° C., preferably from 0° C. to 50° C. The supported catalyst system can be used directly for polymerization. However, it is also possible to remove the solvent and then use the catalyst system in resuspended form for the polymerization.

In a third variant, the support is placed in an aliphatic or aromatic solvent such as toluene, heptane, tetrahydrofuran or diethyl ether. Subsequently, a compound of the formula V, either as such or in dissolved or suspended form, is added to the support. The reaction time is in the range from 1 minute to 24 hours, preferably from 5 minutes to 120 minutes. The reaction temperature is in the range from −10° C. to +200° C., preferably from 20° C. to 100° C. A compound of the formula III or IV is then added either as such or in dissolved or suspended form. The reaction time is in the range from 1 minute to 48 hours, preferably from 5 minutes to 12 hours. The reaction temperature is in the range from −10° C. to +200° C., preferably from 20° C. to 100° C.

Subsequently, a compound of the formula V can again be added, either as such or in dissolved or suspended form, to the reaction mixture. A compound of the formula III or IV can be reacted with a compound of the formula V in any desired stoichiometric ratio. Preference is given to using from 2 to 6 equivalents of a compound of the formula V per 1 equivalent of a compound of the formula III or IV. Particular preference is given to using from 2 to 2.5 equivalents of a compound of the formula V per 1 equivalent of a compound of the formula III or IV. The modified support can directly be used further. However, it can also be resuspended after removal of the solvent.

Subsequently, an organometallic transition metal compound of the formula II, either as such or in dissolved or suspended form, is added to the modified support. The reaction time is in the range from 1 minute to 24 hours. The reaction temperature is in the range from −10° C. to +200° C., preferably from 20° C. to 100° C. This is followed by addition of an organoaluminum compound of the formula V, either as such or in dissolved or suspended form, to the support. Here too, the reaction time is in the range from 1 minute to 24 hours, preferably from 5 minutes to 12 hours. The reaction temperature is in the range from −10° C. to +200° C., preferably from 20° C. to 100° C. The supported catalyst system can be used directly for polymerization. However, it is also possible to remove the solvent and use the catalyst system in resuspended form for the polymerization.

In a fourth variant, the support is placed in an aliphatic or aromatic solvent such as toluene, heptane, tetrahydrofuran or diethyl ether. Subsequently, a compound of the formula II is added, either as such or in dissolved or suspended form, to the support. The reaction time is in the range from 1 minute to 24 hours, preferably from 5 minutes to 120 minutes. The reaction temperature is in the range from −10° C. to +200° C., preferably from 20° C. to 50° C. A compound of the formula V is then added either as such or in dissolved or suspended form. The reaction time is in the range from 1 minute to 48 hours, preferably from 5 minutes to 12 hours. The reaction temperature is in the range from −10° C. to +200° C., preferably from 20° C. to 100° C. The starting materials can be used in any desired stoichiometric ratio. The reaction is preferably carried out using a stoichiometric ratio of compounds of the formula II:compounds or the formula V of from 1:0.01 to 1:400. The reaction is particularly preferably carried out using a stoichiometric ratio of compounds of the formula II:compounds of the formula V of from 1:1 to 1:100. The order of addition of the individual components can, however, also be changed so that firstly a compound of the formula V and then a compound of the formula II are added to the support. After application of the mixture to the support, the solvent is removed and the solid is dried. This solid can at any desired point in time be converted, in a further process step, into a polymerization-active catalyst system by reaction with a cocatalytically active organoboron-aluminum compound A. For this purpose, the modified support is resuspended in an aliphatic or aromatic solvent such as toluene, heptane, tetrahydrofuran or diethyl ether. Subsequently, a compound A is added, either as such or in dissolved or suspended form, to the modified support. The reaction time is in the range from 1 minute to 48 hours, preferably from 5 minutes to 12 hours. The reaction temperature is in the range from −10° C. to +200° C., preferably from 20° C. to 100° C. All starting materials can be used in any desired stoichiometric ratio. The reaction is preferably carried out using a stoichiometric ratio of compound of the formula II:compound A of from 1:0.1 to 1:200. Particular preference is given to carrying out the reaction using a stoichiometric ratio of compound of the formula II:compound A of from 1:1 to 1:20. The supported catalyst system can be used directly for polymerization. However, it is also possible to remove the solvent and to use the catalyst system in resuspended form for the polymerization.

In a fifth variant, the support is placed in an aliphatic or aromatic solvent such as toluene, heptane, tetrahydrofuran or diethyl ether. Subsequently, a compound A is added, either as such or in dissolved or suspended form, to the support. The reaction time is in the range from 1 minute to 48 hours, preferably from 5 minutes to 12 hours. The reaction temperature is in the range from −10° C. to +200° C., preferably from 20° C. to 100° C. A compound of the formula V is then added either as such or in dissolved or suspended form. The reaction time is in the range from 1 minute to 48 hours, preferably from 5 minutes to 12 hours. The reaction temperature is in the range from −10° C. to +200° C., preferably from 20° C. to 100° C. The starting materials can be used in any desired stoichiometric ratio. The reaction is preferably carried out using a stoichiometric ratio of compounds A:compounds of the formula V of from 1:0.01 to 1:400. The reaction is particularly preferably carried out using a stoichiometric ratio of compounds of the formula II:compounds of the formula V of from 1:1 to 1:100. The order of addition of the individual components can, however, also be changed so that firstly a compound of the formula V and then a compound A are added to the support. After application of the mixture to the support, the solvent is removed and the solid is dried. this solid can at any desired point in time be converted, in a further process step, into a polymerization-active catalyst system by reaction with an organometallic transition metal compound of the formula II. For this purpose, the modified support is suspended in an aliphatic or aromatic solvent such as toluene, heptane, tetrahydrofuran or diethyl ether. Subsequently, a compound of the formula II is added, either as such or in dissolved or suspended form, to the modified support. The reaction time is in the range from 1 minute to 48 hours, preferably from 5 minutes to 12 hours. The reaction temperature is in the range from −10° C. to +200° C., preferably from 20° C. to 100° C. All starting materials can be used in any desired stoichiometric ratio. The reaction is preferably carried out using a stoichiometric ratio of compounds of the formula II:compounds A of from 1:0.1 to 1:200. The reaction is particularly preferably carried out using a stoichiometric ratio of compounds of the formula II compounds A of from 1:1 to 1:20. The supported catalyst system can be used directly for polymerization. However, it is also possible to remove the solvent and use the catalyst system in resuspended form for the polymerization.

In addition, a compound for preparing an olefin polymer by polymerization of one or more olefins in the presence of the catalyst system of the present invention is described. The polymerization can be a homopolymerization or copolymerization.

Preference is given to polymerizing olefins of the formula $R^\alpha$—CH=CH—$R^\beta$, where $R^\alpha$ and $R^\beta$ are identical or different and are each a hydrogen atom, a halogen atom, an alkoxy, hydroxy, alkylhydroxy, aldehyde, carboxyl or carboxylic ester group or a saturated or unsaturated hydrocarbon radical having from 1 to 20 carbon atoms, in particular from 1 to 10 carbon atoms, which may be substituted by an alkoxy, hydroxy, alkylhydroxy, aldehyde, carboxyl of carboxylic ester group, or $R^\alpha$ and $R^\beta$ together with the atoms connecting them can form one or more rings. Examples of such olefins are 1-olefins such as ethylene, propylene, 1-butene, 1-hexene, 4-methyl-1-pentene, 1-octene, styrene, cyclic olefins such as norbornene, vinylnorbornene, tetracyclododecene, ethylidenenorbornene, dienes such as 1,3-butadiene or 1,4-hexadiene, biscyclopentadiene or methyl methacrylate.

In particular, propylene or ethylene is homopolymerized or ethylene is copolymerized with one or more $C_3$–$C_{20}$-α-olefins, in particular propylene, and/or one or more $C_4$–$C_{20}$-dienes, in particular 1,3-butadiene, or ethylene is copolymerized with one or more cycloolefins such as norbornene.

The polymerization is preferably carried out at from −60 to 300° C., particularly preferably from 30 to 250° C. The pressure is from 0.5 to 2500 bar, preferably from 2 to 1500 bar. The polymerization can be carried out continuously or batchwise, in one or more stages, in solution, in suspension, in the gas phase or in a supercritical medium.

The supported system can be resuspended as powder or while still moist with solvent and be metered as a suspension in an inert suspension medium into the polymerization system.

A prepolymerization can be carried out using the catalyst system of the present invention. The prepolymerization is preferably carried out using the (or one of the) olefin(s) used in the polymerization. To prepare olefin polymers having a broad molecular weight distribution, preference is given to using catalyst systems comprising two or more different transition metal compounds, e.g. metallocenes.

To remove catalyst poisons present in the olefin, purification using an aluminum alkyl, for example trimethylaluminum, triethylaluminum or triisobutylaluminum, is advantageous. This purification can either be carried out in the polymerization system itself or the olefin is brought into contact with the Al compound and subsequently separated off again prior to addition to the polymerization system.

As molar mass regulator and/or to increase the activity, hydrogen is added if necessary. The total pressure in the polymerization system is from 0.5 to 2500 bar, preferably from 2 to 1500 bar. The compound used according to the present invention is employed in a concentration, based on the transition metal, of preferably from $10^{-3}$ to $10^{-8}$ mol, more preferably from $10^{-4}$ to $10^{-7}$ mol, of transition metal per $dm^3$ of solvent or per $dm^3$ of reactor volume.

Suitable solvents for preparing both the supported chemical compound of the present invention and the catalyst system of the present invention are aliphatic or aromatic solvents such as hexane or toluene, ether solvents such as tetrahydrofuran or diethyl ether or halogenated hydrocarbons such as methylene chloride or halogenated aromatic hydrocarbons such as o-dichlorobenzene.

Before addition of the catalyst system to the polymerization system, another alkylaluminum compound such as trimethylaluminum, triethylaluminum, triisobutylaluminum, trioctylaluminum or isoprenylaluminum can be introduced into the reactor to make the polymerization system inert (for example for removing catalyst poisons present in the olefin). This is added to the polymerization system in a concentration of from 100 to 0.01 mmol of Al per kg of reactor contents. Preference is given to using triisobutylaluminum and triethylaluminum in a concentration of from 10 to 0.1 mmol of Al per kg of reactor contents, which enables a small molar Al/M ratio to be employed in the synthesis of a supported catalyst system.

Furthermore, an additive such as an antistatic can be used in the process of the invention, for example for improving the particle morphology of the olefin powder. It is generally possible to use all antistatics which are suitable for the polymerization. Examples are salt mixtures of calcium salts of Medialanic acid and chromium salts of N-stearylanthranilic acid, as described in DE-A-3543360. Further suitable antistatics are, for example, $C_{12}$- to $C_{22}$-fatty acid soaps of alkali metals or alkaline earth metals, salts of sulfonic esters, esters of polyethylene glycols and fatty acids, polyoxyethylene alkyl ethers, etc. A review of antistatics is given in EP-A 107127.

A mixture of a metal salt of Medialanic acid, a metal salt of anthranilic acid and a polyamine can also be used as antistatic, as described in EP-A 636636.

Commercially available products such as Stadis™ 450 from DuPont, a mixture of toluene, isopropanol, dodecylbenzenesulfonic acid, a polyamine, a copolymer of 1-decene and $SO_2$ and also 1-decene or ASA™-3 from Shell and ARU5R™ 163 from ICI can likewise be used.

The antistatic is preferably used as a solution; in the preferred case of Stadis™ 450, preference is given to using from 1 to 50% by weight of this solution, more preferably from 5 to 25%, based on the mass of the supported catalyst used (support together with covalent bound metallocenium-forming compound and one or more metallocene compounds, e.g. of the formula IV). However, the amounts of antistatic required can vary within wide limits, depending on the type of antistatic used.

The following examples serve to illustrate the invention.

General procedure: preparation and handling of the compounds were carried out with exclusion of air and moisture under argon (Schlenk technique). All solvents required were dried before use by boiling for a number of hours over suitable dessicants and subsequent distillation under argon.

Pentafluorophenylboronic acid was prepared as described in the literature (R. D. Chambers et al., J. Chem. Soc., 1965, 3933).

EXAMPLE 1

Synthesis of bis(dimethylaluminoxy) pentafluorophenylborane 10 ml of trimethylaluminum (2M in toluene, 20 mmol) and 40 ml of toluene are placed in a reaction vessel. At −40° C., 2.1 g of pentafluorophenylboronic acid (10 mmol) in 50 ml of toluene are added dropwise to this solution over a period of 15 minutes. The mixture is stirred at −40° C. for 1 hour and subsequently for a further hour at room temperature. The slightly turbid, light-yellow solution is filtered through a G4 frit. This results in a clear, light-yellow solution (0.1 M based on boron) of bis(dimethylaluminoxy) pentafluorophenylborane in toluene.

EXAMPLE 2

Preparation of the Catalyst System 9 ml of the stock solution of cocatalyst prepared in Example 1 are added to a solution of 53 mg (90 μmol) of dimethylsilanediylbis(2-methyl-4-phenylindenyl) dimethylzirconium in 10.75 ml of toluene. 0.25 ml of trimethylaluminum (2M in toluene) is subsequently injected and the mixture is then stirred at room temperature for 1 hour. 0.5 ml of the stock solution prepared is used for injection into the polymerization system.

EXAMPLE 3

Polymerization

A 300 ml polymerization autoclave (Parr 4560) is charged with 150 ml of heptane under an argon atmosphere. 1.1 ml of TIBA (20% strength) are subsequently added and the mixture is stirred at 20° C. for 20 minutes. The reactor is then heated to 50° C. and 0.5 ml of the catalyst solution prepared as described in Example 2 is injected. The autoclave is subsequently pressurized with ethylene to 10 bar and polymerization is carried out for one hour at a constant ethylene pressure. This gives 11.7 g of polyethylene powder. The catalyst activity is 8.9 kg of PE/g of metallocene×h.

EXAMPLE 4

5 g of $SiO_2$ (PQ MS 3030, pretreated at 140° C., 10 h, 10 mbar) were admixed while stirring with 10 ml of 20% strength trimethylaluminum solution in Varsol. After stirring for 20 minutes, the suspension was filtered and the residue was washed three times with 30 ml of toluene. The residue was then admixed with 100 ml of bis(dimethylaluminoxy) pentafluorophenylborane solution as described in Example 1. The mixture was stirred for 1 hour and the solvent was then removed in an oil pump vacuum. 55 mg of dimethylsilanediylbis(2-methyl-4-phenylindenyl) dimethylzirconium dissolved in toluene were then added dropwise to the dried supported cocatalyst. The mixture was stirred for 30 minutes and the solvent was then removed in an oil pump vacuum, giving 11 g of supported catalyst as a free-flowing powder.

In parallel thereto, a dry 16 dm$^3$ reactor was flushed firstly with nitrogen and subsequently with propylene and charged with 10 dm$^3$ of liquid propylene. 0.5 cm$^3$ of a 20% strength triisobutylaluminum solution in Varsol diluted with 30 cm$^3$ of heptane was then introduced into the reactor and the mixture was stirred at 30° C. for 15 minutes.

Subsequently, 1.5 g of the supported catalyst were resuspended in 30 ml of heptane and introduced into the reactor. The reaction mixture was heated to the polymerization temperature of 60° C. (4° C./min) and the polymerization system was held at 60° C. for 1 hour by cooling.

The polymerization was stopped by venting the remaining propylene. The polymer was dried in a vacuum drying oven.

This resulted in 0.9 kg of polypropylene powder. The reactor displayed no deposits on the inner wall or stirrer. The catalyst activity was 70 kg of PP/g of metallocene×h.

Comparative Example 1

Synthesis of bis(dimethylaluminoxy)methylborane 10 ml of trimethylaluminum (2M in toluene, 20 mmol) and 40 ml of toluene are placed in a reaction vessel. At −40° C., 0.6 g of methylboronic acid (10 mmol) in 50 ml of toluene are added dropwise to this solution over a period of 15 minutes. The mixture is stirred at −40° C. for 1 hour and subsequently for a further hour at room temperature. Filtration results in a clear, yellowish solution (0.1 M based on boron) of bis(dimethylaluminoxy)methylborane in toluene.

Comparative Example 2

Preparation of the Catalyst System 9 ml of the stock solution of cocatalyst prepared in Comparative Example 1 are added to a solution of 53 mg (90 μmol) of dimethylsilanediylbis(2-methyl-4-phenyl-indenyl) dimethylzirconium in 10.75 ml of toluene. 0.25 ml of trimethylaluminum (2M in toluene) is subsequently injected and the mixture is then stirred at room temperature for 1 hour. 0.5 ml of the stock solution prepared are used for injection into the polymerization system.

Comparative Example 3

Polymerization

A 300 ml polymerization autoclave (Parr 4560) is charged with 150 ml of heptane under an argon atmosphere. 1.1 ml of TIBA (20% strength) are subsequently added and the mixture is stirred at 20° C. for 20 minutes. The reactor is then heated to 50° C. and 2 ml of the catalyst solution prepared as described in Comparative Example 2 are injected. The autoclave is subsequently pressurized with ethylene to 10 bar and polymerization is carried out for one hour at a constant ethylene pressure. This gives 2.3 g of polyethylene powder. The catalyst activity is 0.4 kg of PE/g of metallocene×h.

We claim:

1. A catalyst system comprising a) at least one cocatalytically active chemical compound A, b) at least one metallocene B and c) at least one aluminum compound C, wherein the chemical compound A is an organoboron-aluminum compound comprising units of the formula I

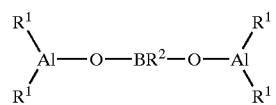

where $R^1$ are identical or different and are each a hydrogen atom, a halogen atom, a $C_1$-$C_{40}$-group such as $C_1$-$C_{20}$-alkyl, $C_1$-$C_{20}$-haloalkyl, $C_1$-$C_{10}$-alkoxy, $C_6$-$C_{20}$-aryl, $C_6$-$C_{20}$-haloaryl, $C_6$-$C_{20}$-aryloxy, $C_7$-$C_{40}$-arylalkyl, $C_7$-$C_{40}$-haloarylalkyl, $C_7$-$C_{40}$-alkylaryl or $C_7$-$C_{40}$-haloalkylaryl or $R^1$ can be an $OSiR_3 3$ group, where $R^3$ are identical or different and are each a hydrogen atom, a halogen atom, a $C_1$-$C_{40}$-group such as $C_1$-$C_{20}$-alkyl, $C_1$-$C_{20}$-haloalkyl, $C_1$-$C_{10}$-alkoxy, $C_6$-$C_{20}$-aryl, $C_6$-$C_{20}$-haloaryl, $C_6$-$C_{20}$-aryloxy, $C_7$-$C_{40}$-arylalkyl, $C_7$-$C_{40}$-haloarylalkyl, $C_7$-$C_{40}$-alkylaryl or $C_7$-$C_{40}$-haloalkylaryl, $R^2$ is pentafluorophenyl.

2. A catalyst system as claimed in claim 1 which further contains a support.

3. A process for preparing a polyolefin by polymerization of one or more olefins in the presence of a catalyst system as claimed in claim 1.

4. The catalyst system of claim 1 wherein the organoboron-aluminum compound I is bis(dimethylaluminoxy)pentafluorophenylborane.

5. The process of claim 3 wherein in the organoboron-aluminoxy compound I is bis(dimethylaluminoxy) pentafluorophenylborane.

* * * * *